US012712925B2

(12) United States Patent
Corona

(10) Patent No.: US 12,712,925 B2
(45) Date of Patent: Aug. 18, 2026

(54) CAUSE DETERMINATION FOR TERMINATED CALLS IN A 5G NETWORK

(71) Applicant: T-Mobile USA, Inc., Bellevue, WA (US)

(72) Inventor: A. Karl Corona, Maple Valley, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 546 days.

(21) Appl. No.: 18/103,339

(22) Filed: Jan. 30, 2023

(65) Prior Publication Data

US 2024/0259437 A1 Aug. 1, 2024

(51) Int. Cl.

*H04L 65/1069* (2022.01)
*H04L 65/1016* (2022.01)
*H04W 76/10* (2018.01)

(52) U.S. Cl.

CPC ...... *H04L 65/1069* (2013.01); *H04L 65/1016* (2013.01); *H04W 76/10* (2018.02)

(58) Field of Classification Search

CPC ............... H04L 65/1016; H04L 63/306; H04L 65/1045; H04L 65/1093; H04L 67/143; H04L 67/14; H04L 41/5009; H04L 12/1407; H04L 12/2829; H04W 36/00226; H04W 76/34; H04W 76/32; H04W 76/30; H04W 8/00; H04W 28/0958; H04W 24/00; H04W 16/22; H04W 72/12; H04W 72/535

See application file for complete search history.

(56) References Cited

U.S. PATENT DOCUMENTS

| | | | | |
|---|---|---|---|---|
| 2019/0261260 | A1* | 8/2019 | Dao | H04W 48/00 |
| 2020/0328953 | A1* | 10/2020 | Taft | H04L 43/091 |
| 2022/0014562 | A1* | 1/2022 | Garcia Azorero | H04L 41/5009 |
| 2022/0094566 | A1* | 3/2022 | Deshpande | H04M 15/57 |
| 2023/0065081 | A1* | 3/2023 | Mantha | H04L 41/12 |
| 2025/0088857 | A1* | 3/2025 | Castellanos Zamora | H04W 12/35 |

FOREIGN PATENT DOCUMENTS

| | | | | |
|---|---|---|---|---|
| WO | WO-2023055852 A1 * | 4/2023 | | H04L 41/28 |

OTHER PUBLICATIONS

3GPP TS 23.501 version 16.6.0 Release 16—System architecture for the 5G System [retrieved May 22, 2025] (Year: 2020).*

(Continued)

*Primary Examiner* — Jinsong Hu
*Assistant Examiner* — Justin Barry
(74) *Attorney, Agent, or Firm* — Lee & Hayes, P.C.

(57) ABSTRACT

Techniques for managing termination causes for a call associated with a Policy Authorization Service of a 5G system are described herein. A telecommunications network can implement a server to determine a cause for a communication session associated with a user equipment (UE) to terminate, and include the cause in a Policy Authorization Service message. The server can identify a value representing the cause for the communication session to terminate, and add the value to the Policy Authorization Service message. The server can evaluate performance of the telecommunications network based on analysis of the causes over time.

18 Claims, 6 Drawing Sheets

(56) References Cited

OTHER PUBLICATIONS

3GPP TS 29.501 version 16.4.0 Release 16—Principles and Guidelines for Services Definition [retrieved May 22, 2025] (Year: 2020).*

3GPP TS 23.502 version 16.15.0 Release 16—Procedures for the 5G System (added to ETSI on Jan. 6, 2023) [retrieved may 22, 2025] (Year: 2023).*

3GPP TSG-CT WG3 Meeting #110-e "Correction of Policy Authorization Delete API 200 OK response body content" [retrieved on Oct. 27, 2025] <https://www.3gpp.org/ftp/tsg_ct/WG3_interworking_ex-CN3/TSGC3_110e/Inbox/Draft/PCC/5GS_Ph1-CT/C3-203494_CR_29514_openApI_Rel16_v1.doc> (Year: 2020).*

TS 129 514 V16. 15.0 "Policy Authorization Service" ETSI [retrieved on Oct. 28, 2025] <https://www.etsi.org/deliver/etsi_ts/129500_129599/129514/16.15.00_60/ts_129514v161500p.pdf> (Year: 2023).*

* cited by examiner

400

CAUSE DETERMINATION FOR TERMINATED CALLS IN A 5G NETWORK

BACKGROUND

Modern terrestrial telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies: Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Telecommunications systems may include fifth generation (5G) cellular-wireless access technologies to provide improved bandwidth and decreased response times to a multitude of devices that may be connected to a network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
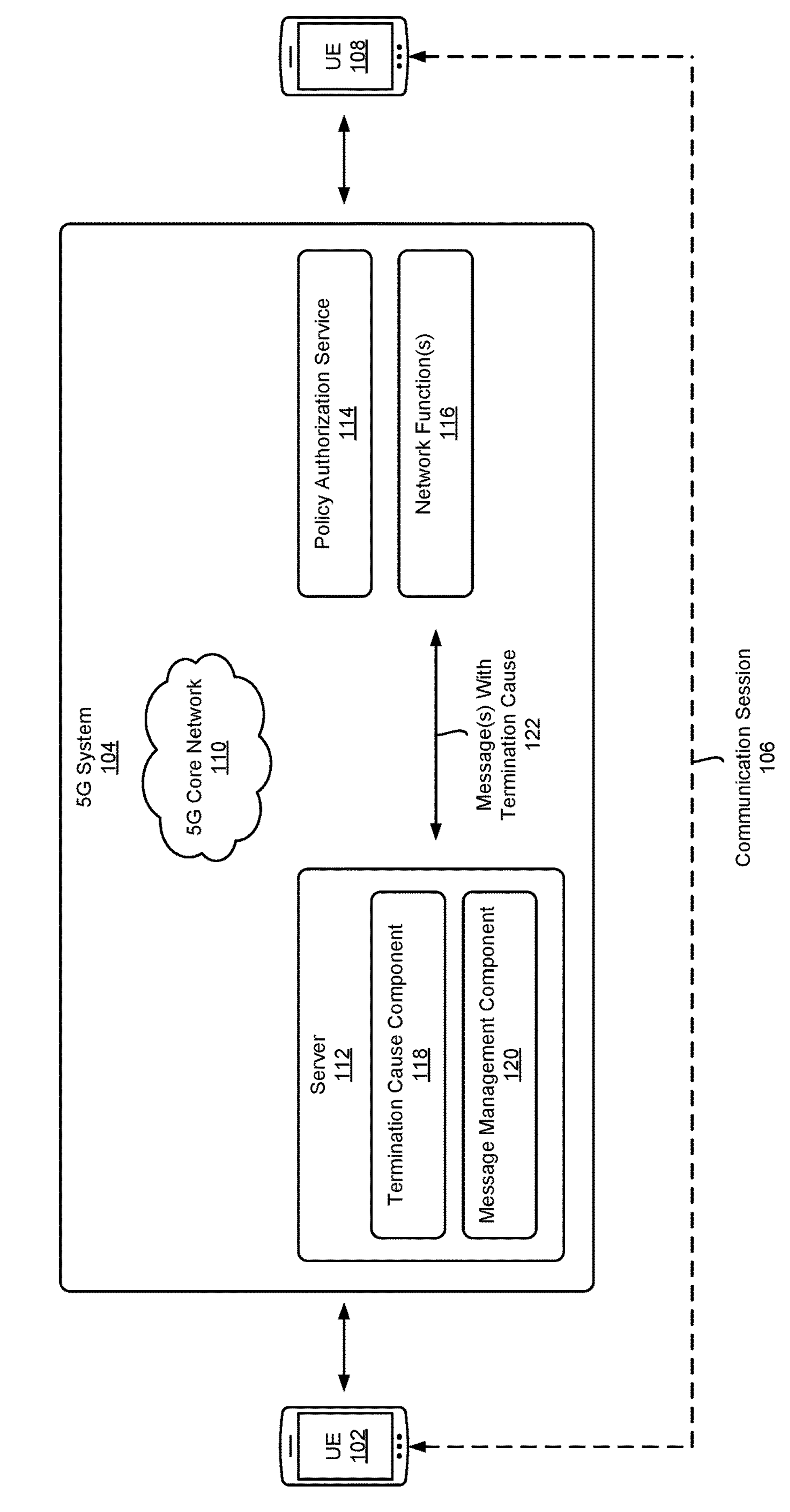
FIG. 1 depicts an example network environment in which an example server determines termination information for a communication session associated with an example user equipment (UE).

A 5G system can implement a Policy Authorization Service to control policy and charging for an application session (or more generally referred to as a communication session). The application session can end for a variety of reasons causing one or more message to be exchanged associated with the Policy Authorization Service. However, a reason for why the application session terminated is typically not included in Policy Authorization Service messages, in particular those using an N5 interface for communicating such messages. Thus, an alternate solution is required to append reasons for an application session termination associated with Policy Authorization Service messages.

This application relates to techniques for determining a termination cause for a call, and including the cause in a message exchanged in association with a Policy Authorization Service of a 5G system. For example, a 5G telecommunications network can implement a server to determine a cause for a communication session associated with a user equipment (UE) to terminate, and generate a Policy Authorization Service message that includes the cause. For example, the server can identify a value representing the cause for the communication session to terminate, and add the value to the Policy Authorization Service message. In some examples, a same or different server or component can evaluate performance of the 5G telecommunications network based on analysis of the causes over time. The cause determination techniques can include adding the cause information to a message exchanged between a Policy Control Function (PCF) and an Application Function (AF) (or an example thereof such as a Proxy Call Session Control Function (PCSCF)) using an N5 interface. By implementing the techniques described herein, reasons for terminated calls can be added to a message for context, stored in a database for later access, and/or evaluated over time to improve operation of the 5G telecommunications network.

In various examples, the 5G telecommunications network can implement one or more components to manage termination causes for a call associated with a Policy Authorization Service (PSA). The one or more components implementing the termination cause techniques described herein can represent firmware, hardware and/or software and can be included in an IMS, or portions thereof (e.g., a PCF, a PCSCF, an AF, etc.). For instance, the one or more components can include a server configured to identify, detect, or otherwise determine a cause for a call (e.g., application session, communication session, or the like) to terminate. The server can also or instead be configured to append a termination cause to a PSA message for exchange with another component or network function of the 5G telecommunications network. For instance, the server can represent a PCSCF which includes the cause for the termination in a message to the PCF (e.g., a message requesting to terminate the call). In another example, the server can represent a PCF that configures a message for sending to another network function, such as the PCSCF. A messages transmitted to and/or from the PCF can be referred to herein as an Npcf message. In various examples, casual information associated with a call termination can be added to an Npcf message such as an Npcf_PolicyAuthorization_delete message. By implementing the one or more components as described herein, data indicating why a communication session terminates can be stored and/or added to messages for use during network analysis operations that identify improvements to the telecommunications network to reduce dropped calls and improve customer satisfaction.

Generally, the server can represent functionality to generate, manage, and/or exchange messages that establish policy and charges for a communication session in association with a Policy Authorization Service. For instance, the server of the 5G telecommunication network can determine that a message requesting to terminate a call is associated with a PCF (e.g., to be sent to and/or sent from the PCF), determine a cause for the termination, and at least one of: modify the message to include the cause (e.g., append the cause in a new message field) or store the cause for analysis. In some examples, the cause for the termination can be associated with a UE ending a call, losing service or a network connection, or being unauthorized to continue the call. Some of the additional examples for why calls can terminate are discussed throughout this disclosure.

In some examples, the server can represent a PCSCF of an IP Multimedia Subsystem (IMS) core configured to manage control plane messages and/or user plane messages associated with a call request from a UE. For example, the server can determine whether a communication session terminates due to an instruction from the UE (e.g., user decides to end the call), authorization expires, service is no longer available, or some other reason. The server may, for example, access another message such as a SIP message or an Rx diameter message, and identify a value (e.g., a registered value, an attribute-value pair (AVP) value) indicative of the cause in the other message. For example, the server can identify a Termination-Cause AVP value in an Rx diameter message (or other message) and add some or all of the text associated with the Termination-Cause AVP value to a PSA message for sending using an N5 interface. Further description of cause determination techniques by the server can be found throughout this disclosure including in the figures below.

FIG. 1 depicts an example network environment 100 in which an example server determines termination information for a communication session associated with an example user equipment (UE). For example, a UE 102 can connect to a 5G system 104 to establish a communication session 106 (e.g., a communication channel for exchanging data) with one or more additional UEs (e.g., UE 108). As depicted in FIG. 1, the 5G system 104 comprises a 5G core network 110, a server 112, a Policy Authorization Service 114, and one or more network functions 116. FIG. 1 further depicts the server 112 comprising a termination cause component 118 and a message management component 120 to implement the cause determination techniques described herein. For instance, the server 112 can be configured to determine a cause for the communication session 106 to terminate, and exchange message(s) with a termination cause 122 with the network function(s) 116.

The UE 102 and the UE 108 represent any device that can wirelessly connect to the telecommunication network, and in some examples may include a mobile phone such as a smart phone or other cellular phone, a personal digital assistant (PDA), a personal computer (PC) such as a laptop, desktop, or workstation, a media player, a tablet, a gaming device, a smart watch, a hotspot, a Machine to Machine device (M2M), a vehicle, an unmanned aerial vehicle (UAV), an Internet of Things (IoT) device, or any other type of computing or communication device. An example architecture for the UE 102 and UE 108 is illustrated in greater detail in FIG. 6.

In various examples, the 5G system 104 can initiate, establish, maintain, format, augment, manage, or otherwise determine secure exchange of text, video, and/or photos including configuring the communication session 106 to enable the UE 102 to communicate with the UE 108. The 5G system 104 can, for example, represent functionality to provide communications between the UE 102 and the UE 108, and can include one or more radio access networks (RANs), as well as one or more core networks linked to the RANs. For instance, a UE 102 can wirelessly connect to a base station or other access point of a RAN, and in turn be connected to the 5G core network 110. The RANs and/or core networks can be compatible with one or more radio access technologies, wireless access technologies, protocols, and/or standards. For example, wireless and radio access technologies can include fifth generation (5G) technology, Long Term Evolution (LTE)/LTE Advanced technology, other fourth generation (4G) technology, third generation (3G) technology, High-Speed Data Packet Access (HSDPA)/Evolved High-Speed Packet Access (HSPA+) technology, Universal Mobile Telecommunications System (UMTS) technology, Global System for Mobile Communications (GSM) technology, Wi-Fi technology, and/or any other previous or future generation of radio access technology. In this way, the 5G system 104 is compatible to operate with other radio technologies including those of other service providers.

In some examples, the 5G core network 110 can represent a service-based architecture that includes multiple types of network functions (e.g., the network function(s) 116) that process control plane data and/or user plane data to implement services for the UE 102. In some examples, the services comprise rich communication services (RCS), a VoNR service, a ViNR service, and the like which may include a text, a data file transfer, an image, a video, or a combination thereof. The network functions of the 5G core network 110 can include an Access and Mobility Management Function (AMF), a Session Management Function (SMF), a User Plane Function (UPF), a Policy Control Function (PCF), and/or other network functions implemented in software and/or hardware, to name a few. Examples of network functions are also discussed in relation to FIG. 2, and elsewhere.

Generally, the server 112 can represent an IP Multimedia Subsystem (IMS), or component thereof such as an AF, a PCSCF, or a PCF. For example, the server 112 can exchange the message(s) with a termination cause 122 with the network function(s) 116 (e.g., a PCF). By way of example and not limitation, the server 112 can represent a PCSCF which implements the termination cause component 118 to determine a cause for the communication session 106 to terminate, and implements the message management component 120 to generate, modify, or otherwise configure a message to include the termination cause for sending to a PCF or other network function. In this way, termination cause information that would otherwise be unavailable to the PCF can instead be added, appended, or otherwise included in a message received and/or sent by the PCF. In examples when the server 112 represents a PCF, the network function(s) 116 can represent a PCSCF, or another network function other than the PCF.

The Policy Authorization Service 114 can represent a service-based architecture providing charging and authorization for the communication session 106 between the UE 102 and the UE 108. For example, the UE 102 can initiate a call to the UE 108 causing the Policy Authorization Service 114 to establish charges and/or policies for the communication session 106.

The termination cause component 118 can be configured to determine a cause for the communication session 106 to terminate between the UE 102 and the UE 108 (or between the UE 102 and the server 112). For instance, the termination cause component 118 can detect, identify, or otherwise determine a value representing a reason for the communication session to terminate (e.g., a Termination-Cause AVP Value, a text description, etc.). The Termination-Cause AVP Value can be defined by one or more of: Technical Specification 29.212, Technical Specification 29.214, Technical Specification 29.512, or Technical Specification 29.514 associated with a standards organization. In some examples, the termination cause component 118 can identify a text value in another message associated with the server such as a termination cause code included in a Session Initiation Protocol message or in a message sent in association with an Rx interface by the 5G core network 110.

In various examples, the termination cause component 118 can monitor messages exchanged by the server 112 and detect messages that are associated with the Policy Authorization Service 114. For example, the termination cause component 118 can determine that a message is a Policy Authorization Service message based at least in part on analyzing portions of a message to identify whether the message includes "Npcf" and/or determining whether the message is to be sent using an N5 interface. The N5 interface is defined by a standard to represent a channel or communications between an AF and PCF, such as Technical Specification 29.514.

In some examples, the server 112 can receive a message for sending to the PCF indicating that the communication session 106 (and charges and/or policies associated therewith) has terminated. In a non-limiting example, the server 112 can receive an Npcf service-based message such as a Npcf_PolicyAuthorization_delete message for sending to the PCF, and determine a cause for adding to the Npcf_PolicyAuthorization_delete message.

The message management component 120 can represent functionality to generate or modify a message (e.g., the Npcf service-based message) to include a cause for the communication session 106 to terminate. For example, the message management component 120 can add or append a value representing the cause to a received message to generate the message(s) with termination cause 122 for sending to the network function(s) 116. In various examples, the message management component 120 can provide functionality to include a field in Npcf service-based messages for the value representing the cause determined by the termination cause component 118. For example, the field can be added to an HTTP or HTTP2 header associated with the Npcf_PolicyAuthorization_delete message to communicate the cause.

The message management component 120 can be configured to determine a protocol or interface for transmitting the message(s) with termination cause 122 based at least in part on the network function receiving the message. For instance, the message(s) with termination cause 122 can be sent using an N5 interface in examples when the network function is the PCF, though other N-interface types may be used in other examples.

In some examples, functionality associated with the termination cause component 118 and/or the message management component 120 can be included in the UE 102 or another component or entity of the 5G system 104. For example, functionality provided by the termination cause component 118 and/or the message management component 120 can be implemented by the UE 102, in addition to or instead of the server 112.

The communication session 106 can terminate or end for a variety of reasons, and the termination cause component 118 can append the reason(s) in a message using different levels of detail. For example, a user of the UE 102 or the UE 108 can provide an input to end the communication session 106 resulting in a message being sent to the Policy Authorization Service 114. The server 112 can detect the message, determine that the user initiated the termination, and add a value to the message to convey the reason (e.g., "logout" or other text). Other reasons the communication session 106 can terminate can be due to a network element operating at capacity, an incompatibility between a radio frequency or radio band available to the UE 102, among others. In some examples, the message(s) with termination cause 122 indicating that the user ended the communication can be sent to the PCF, stored in a memory, database, or other storage device for later access (e.g., to analyze multiple causes over time to assess ways to improve the 5G core network for causes related to a network element), and/or streamed to a machine learned model or other component for analysis. Additionally, or alternatively, the message(s) with termination cause 122 can be sent to a third-party monitoring service or other system configured to evaluate the termination cause 122 for assessing performance of the 5G core network 110. In this way, reasons for terminated calls can be added to a message for context, stored in a database for later access, and/or evaluated over time to improve operation of the 5G telecommunications network (e.g., reduce lost calls, reduce latency for data exchanged using a communication session, improve customer satisfaction, etc.).

Figure 2:
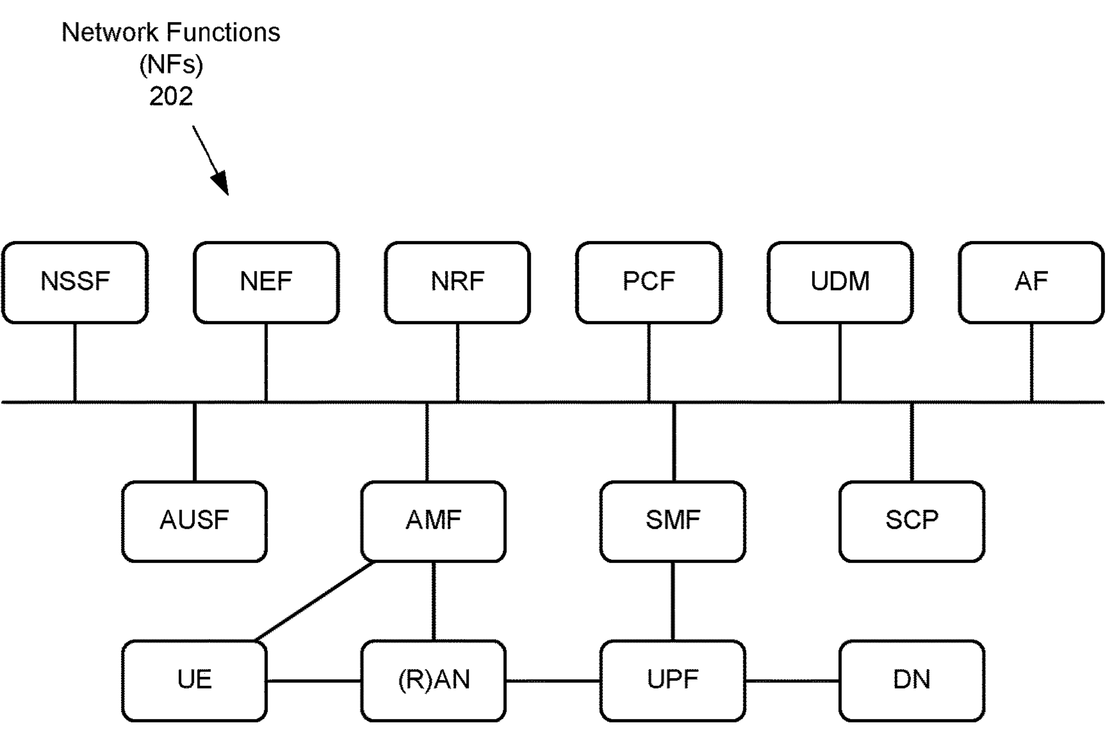
FIG. 2 depicts an example system architecture for a fifth generation (5G) telecommunication network.

FIG. 2 depicts an example system architecture for a fifth generation (5G) telecommunication network. In some examples, the telecommunication network can comprise the 5G core network 110 in FIG. 1 that includes a service-based system architecture in which different types of network functions (NFs) 202 operate alone and/or together to implement services. Standards for 5G communications define many types of NFs 202 that can be present in 5G telecommunication networks (e.g., the 5G core network 110), including but not limited to an Authentication Server Function (AUSF), Access and Mobility Management Function (AMF), Data Network (DN), Unstructured Data Storage Function (UDSF), Network Exposure Function (NEF), Network Repository Function (NRF), Network Slice Selection Function (NSSF), Policy Control Function (PCF), Session Management Function (SMF), Unified Data Management (UDM), Unified Data Repository (UDR), User Plane Function (UPF), Application Function (AF), User Equipment (UE), (Radio) Access Network ((R)AN), 5G-Equipment Identity Register (5G-EIR), Network Data Analytics Function (NWDAF), Charging Function (CHF), Service Communication Proxy (SCP), Security Edge Protection Proxy (SEPP), Non-3GPP InterWorking Function (N3IWF), Trusted Non-3GPP Gateway Function (TNGF), and Wireline Access Gateway Function (W-AGF), many of which are shown in the example system architecture of FIG. 2.

One or more of the NFs 202 of the 5G core network 110 can be implemented as network applications that execute within containers (not shown). The NFs 202 can execute as hardware elements, software elements, and/or combinations of the two within telecommunication network(s), and accordingly many types of the NFs 202 can be implemented as software and/or as virtualized functions that execute on cloud servers or other computing devices. Network applications that can execute within containers can also include any other type of network function, application, entity, module, element, or node.

The 5G core network 110 can, in some examples, determine a connection between an IMS that manages a communication session for the UE 102, including sessions for short messaging, voice calls, video calls, and/or other types of communications. For example, the UE 102 and the IMS of the 5G system 104 can exchange Session Initiation Protocol (SIP) messages to set up and manage individual communication sessions. In some examples, the IMS of the 5G system 104 can generate a communication channel for a voice or video communication between the UE 102 and the UE 108.

Figure 3:
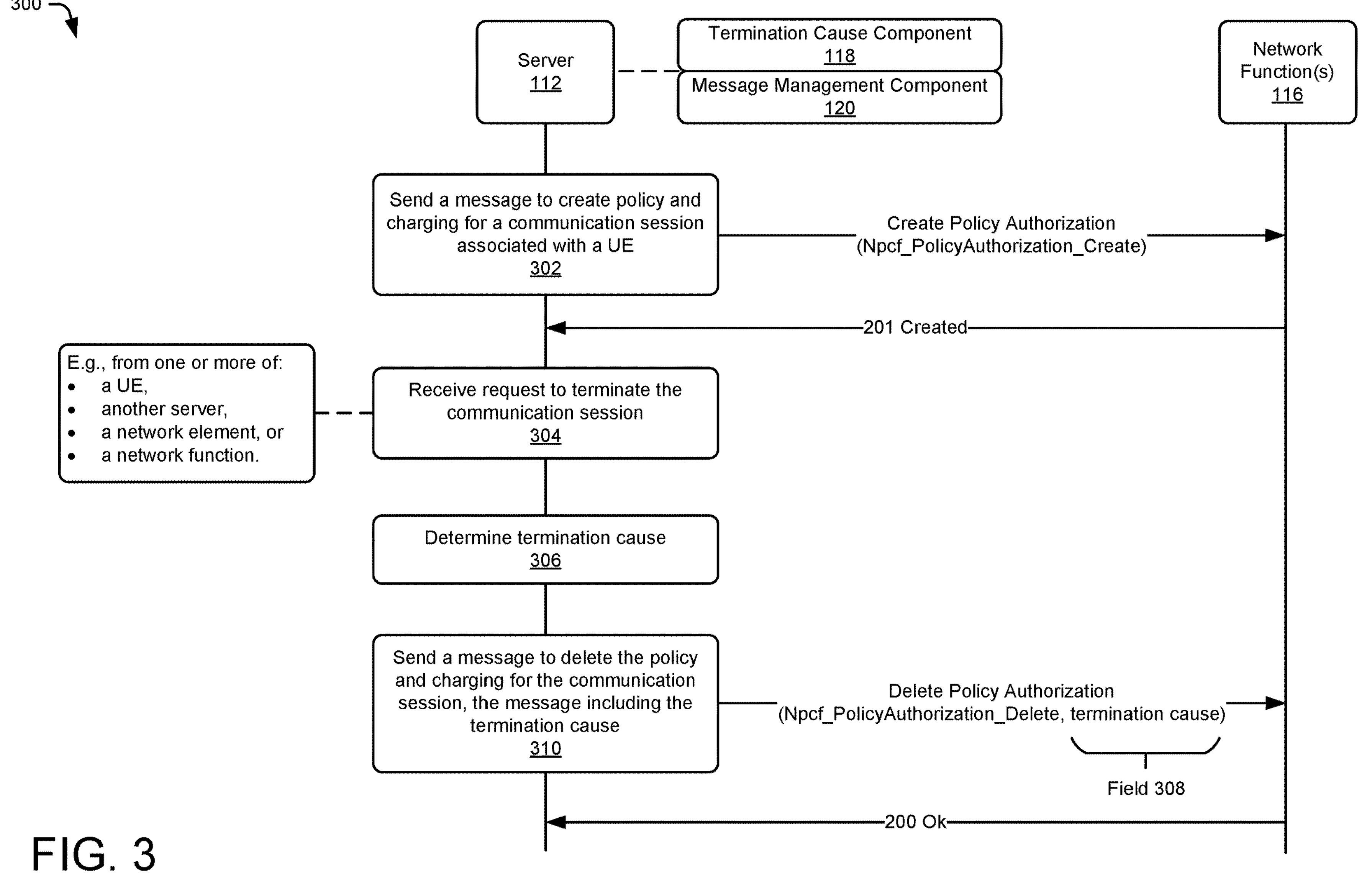
FIG. 3 depicts an example server implementing techniques to include a cause for a communication session to terminate in a message associated with an example service provided by a 5G telecommunication network.

FIG. 3 depicts an example server implementing techniques 300 to include a cause for a communication session to terminate in a message associated with an example service (e.g., a Policy Authorization Service) provided by a 5G telecommunication network. For example, the server 112 of FIG. 1 may determine a cause for a communication session to terminate and include the cause in one or more messages exchanged with the network function(s) 116 (e.g., a PCF) of the 5G system 104. FIG. 3 depicts the server 112 comprising a termination cause component 118 and the message management component 120.

In some examples described in relation to FIG. 3, the server 112 implementing the techniques 300 can represent an AF (or a PCSCF) and the network function(s) 116 can represent a PCF. However, in other examples, the server 112 can represent a PCF and the network function(s) 116 can represent a PCSCF, or another network function other than the PCF.

In various examples, the UE 102 can send a message requesting a communication channel to an IMS of the 5G system 104. The IMS can establish a control plane by exchanging control plane messages with the UE 102. The UE 102 and the IMS can exchange one or more message(s) (e.g., a diameter message, a Create Session Request, a Create Session Response, a SIP message, and so on) to successfully establish the control plane (e.g., complete SIP registration of the UE 102). Upon establishing the control plane, the IMS and the UE 102 can exchange message(s) to establish a dedicated bearer. For instance, the IMS can send the UE 102 a message indicating a request to create a dedicated bearer. Given that the control plane is established (e.g., using a default bearer), the request to create the dedicated bearer sent from the IMS to the UE 102 can include a message to establish a user plane for allowing transfer of one or more user plane audio packets and/or user plane video packets. Thus, a variety of messages can be exchanged between the 5G system 104 and the UE 102 to establish and maintain the communication session (e.g., the communication session 106) including messages associated with a Policy Authorization Service (e.g., the Policy Authorization Service 114). Some of the exchanged messages can include messages associated with ending a call (e.g., a SIP message, a diameter message associated with the dedicated bearer, and the like) and the server 112 can be configured to identify a cause code (e.g., a value or text indicating a cause for the call to terminate) based at least in part on analyzing one or more of the messages.

At 302, the server 112 can send a message to create policy and charging for a communication session associated with a UE. For example, the server 112 can send a message (e.g., a Create Policy Authorization message) to the network function 116 to authorize a communication session request from the UE. In one non-limiting example, the server 112 can send a Npcf_PolicyAuthorization_Create message associated with the Policy Authorization Service to the network function 116. Responsive to receiving the message at 302, the network function 116 can send a 201 created message to the server 112.

At 304 the server 112 can receive a request to terminate the communication session. For example, the communication session can terminate for a variety of reasons, and the server 112 can receive an indication that the communication session has ended, and the message management component 120 can generate a message for sending to the network function 116 to delete Policy Authorization operations associated with the communication session. The operation 304 can include receiving the request from one of: the UE 102, another server, a network element of the 5G core network 110, or another network function. Generally, the server 112 can identify, detect, or receive a message indicating that the communication session ended, such as a SIP message, a diameter-based message, a Policy Authorization Service message associated with a first time, and add a cause for the termination to a Policy Authorization Service message for sending to the network function 116, as further discussed elsewhere herein including below.

In some examples, the operation 304 can include the server 112 receiving a message (e.g., a SIP message, a diameter-based message, etc.) from the UE 102 requesting to end the communication session. For instance, the UE 102 can send a SIP BYE message or a SIP CANCEL message with a cause code to the server 112. In such examples, a cause for the termination can be included as a cause code in the message, and at operation 306, the server 112 can determine the termination cause based at least in part on extracting the cause code from the message. For instance, the message received from the UE 102 can be a SIP message that includes a cause code reciting "logout", or the like, to indicate the UE 102 ended the communication session. In some examples, the termination cause component 118 can identify a cause code associated with a message from the UE 102, and the message management component 120 can configure a Policy Authorization message (e.g., Npcf_PolicyAuthorization_Delete message) for sending to the network function 116 (e.g. the PCF) that includes the termination cause. Typically, the PCF does not receive the termination cause when receiving a Npcf_PolicyAuthorization_Delete message. Using the techniques described herein, the message management component 120 can configure the Npcf_PolicyAuthorization_Delete message to include the termination cause in a field 308 of the message (e.g., a portion of a header added to include text or a value associated with a cause for the termination).

In various examples, the operation 304 can include the server 112 receiving a message (e.g., a SIP message, a diameter-based message, etc.) from another server, component, or network element requesting to end the communication session. For example, the other server, component, or network element can send a SIP BYE message or a SIP CANCEL message (or other SIP message type) with a cause code to the server 112 usable for determining the termination cause.

In some examples, the operation 304 can include the server 112 receiving a message (e.g., a SIP message, a diameter-based message, etc.) from another server or network function such as a PCSCF, an AF, Access Transfer Gateway (ATGW), Access Transfer Control Function (ATCF), or the like, requesting to end the communication session and/or charges and policies associated with the communication session. For instance, the server 112 can receive a Npcf_PolicyAuthorization_Delete message at operation 304 that does not include a reason why the policy authorization is being requested for deletion (e.g., the message does not indicate a termination cause for a communication session).

At 306, the server 112 can determine a cause for the communication session to terminate. For instance, responsive to receiving the request at 304, the server 112 can, at 306 identify a value or text representing the termination cause in another message (e.g., a second message) received by the server 112 at a previous time. For example, one or more messages associated with ending a call (e.g., a SIP message, a diameter message associated with the dedicated bearer, a "logout" message, and the like) can be analyzed by the server 112 to identify the value and/or text indicating a cause for the communication session to terminate.

At 310, the server 112 can send the message to delete the policy and charging for the communication session, including the termination cause in the field 308, to the network function 116. For example, the message management component 120 can configure the Npcf_PolicyAuthorization_Delete message to include the termination cause in the field 308 of the message, and send the configured message to cause the network function 116 to perform operations associated with finalizing or deleting policy and charging information for the communication session. In some examples, the field can represent a portion of a header added to a message for including text or a value associated with a cause for the termination.

Though the termination cause component 118 and the message management component 120 are illustrated in FIG. 3 individually, it is understood that the termination cause component 118 and the message management component 120 (or functionality provided therefrom) may be directly coupled to and/or integrated into an IMS of the 5G system 104 and/or another component of the 5G system 104. In one example, the cause determination techniques described herein can be implemented as logic (e.g., programmable code) stored in a PCF, PCSCF, an AF, or other component of the 5G system.

Figure 4:
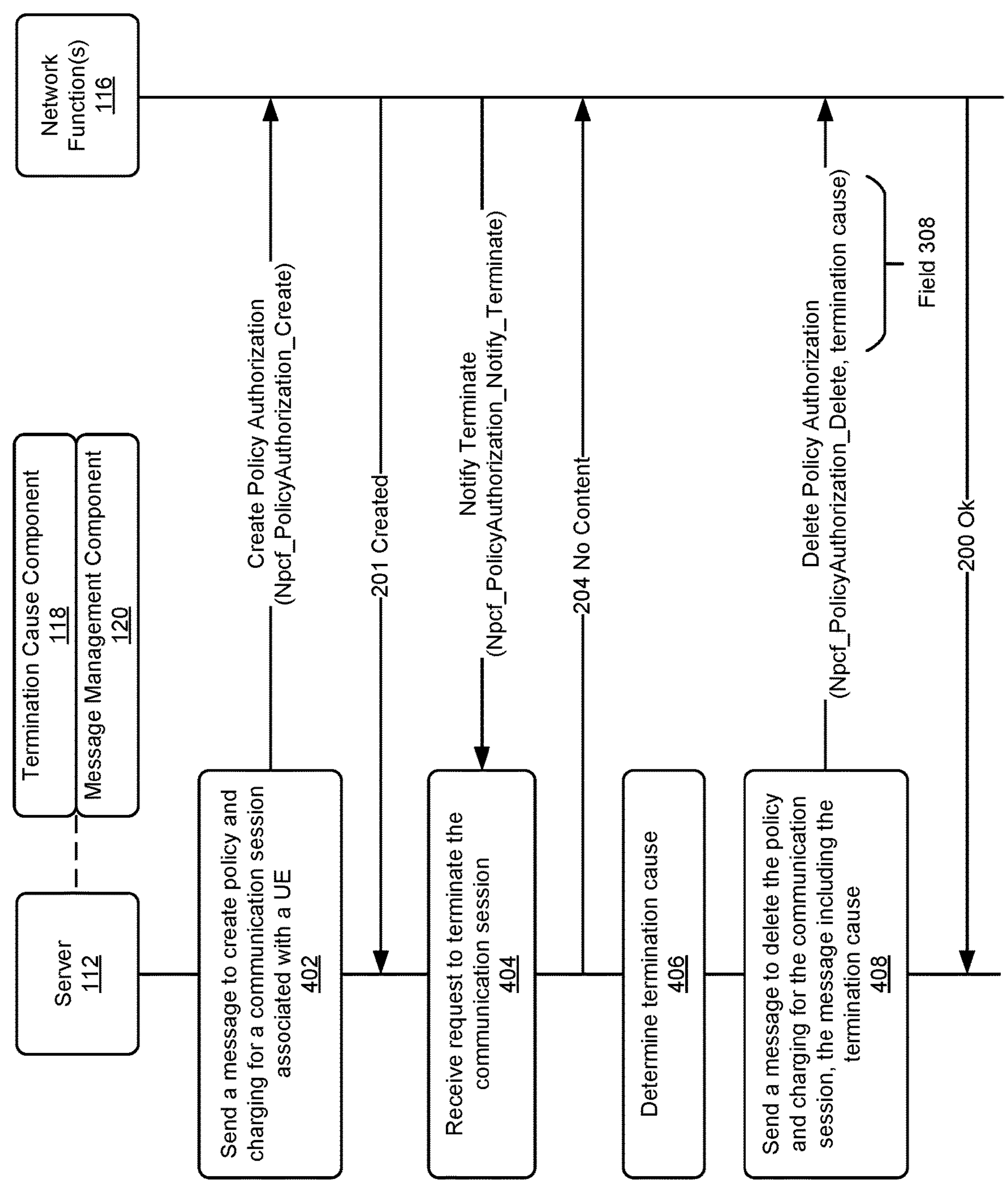
FIG. 4 an example server implementing techniques to include a cause for a communication session to terminate in a message associated with an example service based on receiving a message from an example network function.

FIG. 4 an example server implementing techniques 400 to include a cause for a communication session to terminate in a message associated with an example service (e.g., a Policy Authorization Service) based on receiving a message from an example network function (e.g., a PCF). For example, the server 112 of FIG. 1 may determine a cause for a communication session to terminate and include the cause in one or more messages exchanged with the network function(s) 116 (e.g., a PCF) of the 5G system 104. FIG. 4 depicts the server 112 comprising a termination cause component 118 and the message management component 120. In some examples described in relation to FIG. 4, the server 112 implementing the techniques 400 can represent an AF (or a PCSCF) and the network function(s) 116 can represent a PCF.

At 402, the server 112 can send a message to create policy and charging for a communication session associated with a UE. For example, the server 112 can send a message (e.g., a Create Policy Authorization message) to the network function 116 to authorize a communication session request from the UE. In one non-limiting example, the server 112 can send a Npcf_PolicyAuthorization_Create message associated with the Policy Authorization Service to the network function 116. Responsive to receiving the message at 302, the network function 116 can send a 201 created message to the server 112.

At 404 the server 112 can receive a request to terminate the communication session from the network function 116. For instance, the PCF an send a Npcf_PolicyAuthorization_Notify message indicating to terminate a communication session (e.g., the communication session 106). Responsive to receiving the request at 404, the server 112 can send one of: a 204 No Content created message to the server 112.

At 406, the server 112 can determine a cause for the communication session to terminate. For instance, responsive to receiving the request at 404, the server 112 can identify a value or text representing the termination cause for the communication session. As discussed herein, the server 112 can determine the cause from another message accessible by the server 112. In some examples, the termination cause component 118 can determine the cause based at least in part on a cause code defined by a standard, such as a Termination-Cause AVP Value identified in another message associated with ending the communication session. The cause output by the termination cause component 118 can be a same description associated with the Termination-Cause AVP Value (e.g., diameter_logout, diameter_link_broken, admin reset, admin reboot, port error, etc. associated with a diameter based interface) and/or a JSON attribute associated with an HTTP2 (or similar) interface. In other examples, the cause output by the termination cause component 118 can include a portion of the description associated with a Termination-Cause AVP Value (e.g., logout, link broken, reset, reboot, etc.) and/or a JSON attribute.

In various examples, the termination cause component 118 can identify first text associated with a cause for a communication session from another message associated with the server, modify the first text to output second text different from the first text, and output the second text to represent the cause for the communication session to terminate. For example, the termination cause component 118 can access another message related to ending the communication session such as a diameter message, a SIP message, or other message used to maintain and/or terminate the communication session, and identify a value or text describing the termination cause. The termination cause component 118 can add or remove text associated with the cause to improve accuracy of the description. For example, the termination cause component 118 can identify the cause as a port error and include additional information about the port, information about the UE, a network element serving the UE, or other data associated with the communication session that may be useful in analyzing the cause at a later time. Using the techniques described herein, the server 112 can determine a description for a termination cause that includes a different amount of information from an amount of information conveyed using typical cause codes.

In various examples, the termination cause component 118 can determine the termination cause based at least in part on a pre-determined list of causes that is generated and maintained by the message management component 120. For example, the pre-determined list of causes can include cause codes defined by a standards organization and/or causes defined by a representative (e.g., an administrator or engineer) of the telecommunications network. The pre-determined list can include descriptions that are more detailed than the cause codes defined by the standards organization. In some examples, the pre-determined list can map a cause code defined by the standards organization to a cause code defined by the representative, and the server 112 can access the pre-determined list to map a cause code identified in another message to a cause that will be included in a modified message for sending to the network function 116.

At 408, the server 112 can send the message to delete the policy and charging for the communication session, including the termination cause in the field 308, to the network function 116. For example, the message management component 120 can configure the Npcf_PolicyAuthorization_Delete message (or other Npcf service-based message) to include the termination cause in the field 308 of the message, and send the configured message to cause the network function 116 to perform operations associated with deleting policy and charging information for the communication session.

In various examples, the message management component 120 can generate a message that includes a field, or portion, for identifying the cause for the communication session to terminate. The cause can be included in a variety of areas of the message including but not limited to a header or a body of the message. In some examples, multiple fields can be generated to convey different levels of detail relating to the cause for the termination. For instance, a first field can include a brief description of the cause, such as: admin, network, user initiated, user equipment, lost service, etc. A second field can provide further detail, such as types of admin actions, types or names of network elements associated with the communication session, which user ended the session, technological deficiencies of the user equipment that caused the termination, settings of components or network elements during termination, etc. However, in other examples, the causal information can be conveyed using a single field.

In some examples, the message management component 120 can concatenate data representing the termination cause with a message associated with the server 112 (e.g., a message received at a previous time). For example, the server 112 can receive or otherwise identify that a message associated with a Policy Authorization Service is to be sent using an N5 interface, and the message management component 120 can concatenate a termination cause determined by the termination cause component 118 with the message. In this way, messages exchanged using the N5 interface can be modified to include termination cause information that would otherwise not be included in the message.

In some examples, the message management component 120 can generate the message(s) with termination cause for sending using an N5 interface based at least in part on determining that a message does not include a reason for termination. Additionally, or alternatively, the message management component 120 can generate the message(s) with a termination cause based at least in part on a determining that the message is associated with a Policy Authorization Service implemented by a Policy Control Function (PCF). Accordingly, the techniques 400 can represent a solution to provide causal information associated with termination of a communication session for Policy Authorization Service messages exchanged using an N5 interface.

In various examples, the message management component 120 can determine whether the cause for the communication session to terminate is an expected result or an unexpected result. To illustrate, the cause is an expected result in examples when a user initiates ending the communication session or the PCF initiates ending the communication session for reasons related to authorization and charging (e.g., authorization expired), just to name a few. An unexpected result can include causes related to losing service (e.g., losing a connection to the telecommunications network) such as a network element (e.g., a base station, an antennae, a transceiver, or other serving node) operating at capacity, or the like. The message management component 120 can determine whether the cause for the communication session to terminate is an expected result or an unexpected result based at least in part on whether the cause is initiated by the UE or the telecommunications network. Unexpected results output by the message management component 120 over time can be used to determine performance of the 5G core network 110. For instance, a component of the 5G core network 110 can output key performance indicators based at least in part on a number of unexpected results over a time period.

Figure 5:
FIG. 5 depicts a flowchart of an example process for including a termination cause in a message associated with a Policy Authorization Service.
Figure 5:
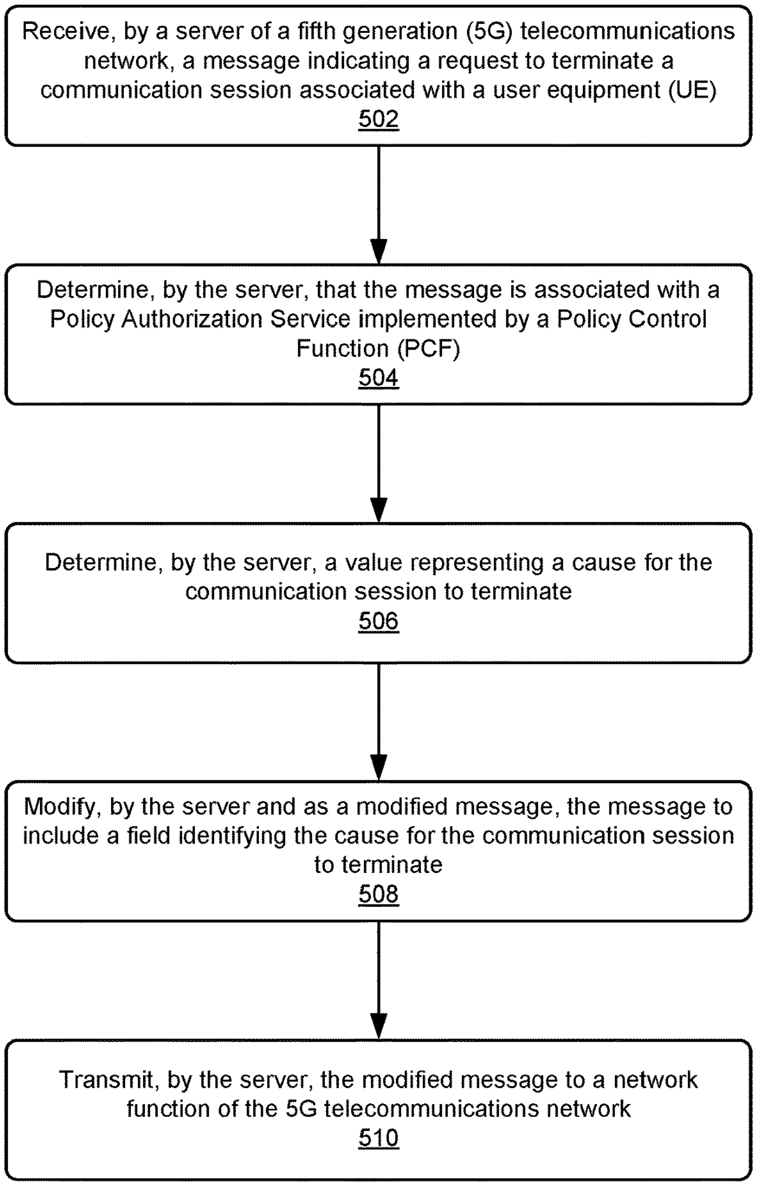

FIG. 5 depicts a flowchart of an example process 500 for including a termination cause in a message associated with a Policy Authorization Service. Some or all of the process 500 may be performed by one or more components in FIGS. 1-4, as described herein. For example, some or all of process 500 may be performed by the UE 102, the server 112, or the network function(s) 116 of FIG. 1.

At operation 502, the process may include receiving, by a server of a fifth generation (5G) telecommunications network, a message indicating a request to terminate a communication session associated with a user equipment (UE). In some examples, the operation 502 may include the server 112 receiving a message from the UE 102, another server, or a network function. The message can include, for example, SIP message data, Rx interface data, diameter message data, or Npcf service based message data indicating to end the communication session (or service provided therefrom) between the UE 102 and another computing device.

In some examples, the operation 502 may include the server 112 receiving a diameter message indicating that the communication session has ended (which can include termination cause information), and the server 112 can be configured to notify a service affected by the communication session, such as a Policy Authorization Service. In other examples, the operation 502 may include the server 112 (e.g., an IMS) receiving a message associated with notifying the PCF of a change to the Policy Authorization Service. For instance, the message can include a Npcf service-based message such as a Npcf_PolicyAuthorization_delete message for sending to the PCF (which does not include termination cause information).

At operation 504, the process may include determining, by the server, that the message is associated with a Policy Authorization Service implemented by a Policy Control Function (PCF). For instance, the server 112 can detect that the message includes "Npcf" in a header or body of the message and is therefore an Npcf service-based message. In various examples, the server 112 can determine that the message is associated with a Policy Authorization Service based at least in part on identifying that the message is to be sent to the PCF using an N5 interface. Additionally, or alternatively, the server 112 can determine that the message is associated with the Policy Authorization Service based at least in part on the message instructing the server 112 to configure a message for sending to the Policy Authorization Service (e.g., a SIP message with a termination cause notifying the server to finalize charges and end policies associated with the communication session).

At operation 506, the process may include determining, by the server, a value representing a cause for the communication session to terminate. In some examples, the operation 506 may include the server 112 identifying the value in the message received at operation 502 (e.g., from a SIP message, Rx interface message, diameter message, and the like). The value can represent, for example, a numeral or human-readable text describing the termination cause. The operation 506 can include the server 112 accessing a predetermined list of causes from a database or memory which includes cause codes defined by a standards organization and/or causes defined by a representative (e.g., an administrator or engineer) of the telecommunications network. In some examples, the server 112 can determine the value representing the termination cause based at least in part on determining a value mapped to a cause in the pre-determined list. By way of example and not limitation, the server 112 can determine that a cause code (e.g., a Termination-Cause AVP Value, an JSON attribute value, or the like) associated with a previously received message is to be included in a Npcf_PolicyAuthorization_delete message for sending to the PCF.

At operation 508, the process may include modifying, by the server and as a modified message, the message to include a field identifying the cause for the communication session to terminate. In some examples, the operation 508 may include the server 112 implementing the message management component 120 to modify the message by adding a field, or portion, to the message for including termination cause. In some examples, the operation 508 can include the server 112 generating a message for sending to the PCF that concatenates the value representing the cause for the communication session to terminate in an Npcf service-based message (e.g., the Npcf_PolicyAuthorization_delete message).

At operation 510, the process may include transmitting, by the server, the modified message to a network function of the 5G telecommunications network. In some examples, the operation 510 may include the server 112 (e.g., an AF or PCSCF) transmitting the Npcf service-based message (e.g., the Npcf_PolicyAuthorization_delete message) to the PCF using the N5 interface. Accordingly, termination cause information that would otherwise not be included in the Npcf service-based message can be associated with the message for analysis or other reasons.

Figure 6:
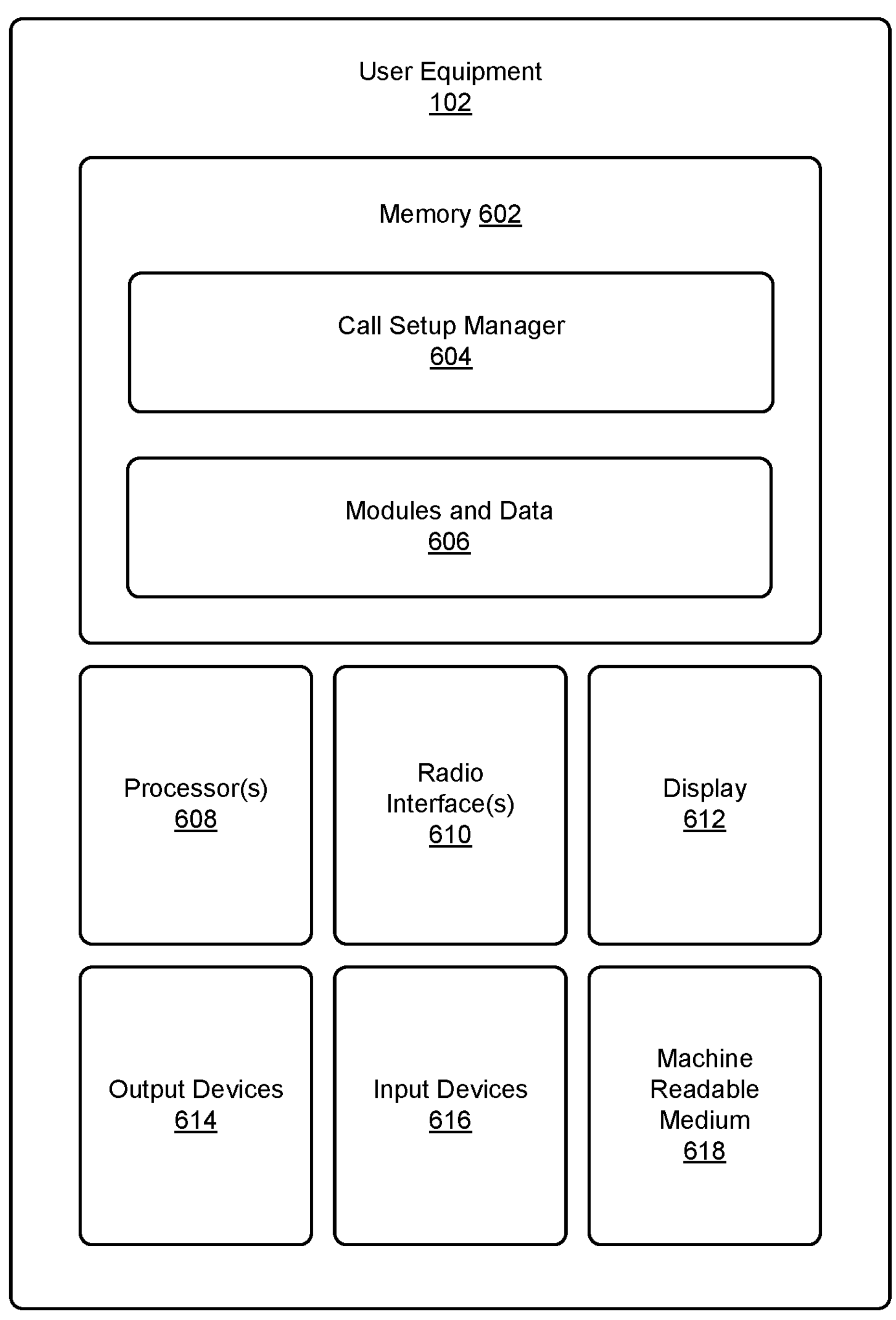
FIG. 6 depicts an example system architecture for a user equipment.

FIG. 6 depicts an example system architecture for a UE 102, in accordance with various examples. As shown, a UE 102 can have memory 602 storing a call setup manager 604, and other modules and data 606. A UE 102 can also comprise processor(s) 608, radio interfaces 610, a display 612, output devices 614, input devices 616, and/or a machine readable medium 618.

In various examples, the memory 602 can include system memory, which may be volatile (such as RAM), non-volatile (such as ROM, flash memory, etc.) or some combination of the two. The memory 602 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the UE 102. Any such non-transitory computer-readable media may be part of the UE 102.

The call setup manager 604 can send and/or receive messages comprising a VoNR service, a ViNR service, and/or an RCS service including SIP messages associated with setup and management of a call session via the IMS. The SIP messages can include an SIP INVITE message and/or other SIP messages. The call setup manager 604 can also or instead send and/or receive messages associated with establishing a control plane and/or a user plane.

The other modules and data 606 can be utilized by the UE 102 to perform or enable performing any action taken by the UE 102. The modules and data 606 can include a UE platform, operating system, and applications, and data utilized by the platform, operating system, and applications.

In various examples, the processor(s) 608 can be a central processing unit (CPU), a graphics processing unit (GPU), or both CPU and GPU, or any other type of processing unit. Each of the one or more processor(s) 608 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 608 may also be responsible for executing all computer applications stored in the memory 602, which can be associated with common types of volatile (RAM) and/or nonvolatile (ROM) memory.

The radio interfaces 610 can include transceivers, modems, interfaces, antennas, and/or other components that perform or assist in exchanging radio frequency (RF) communications with base stations of the telecommunication network, a Wi-Fi access point, and/or otherwise implement connections with one or more networks. For example, the radio interfaces 610 can be compatible with multiple radio access technologies, such as 5G radio access technologies and 4G/LTE radio access technologies. Accordingly, the radio interfaces 610 can allow the UE 102 to connect to the 5G system 104 as described herein.

The display 612 can be a liquid crystal display or any other type of display commonly used in UEs. For example, display 612 may be a touch-sensitive display screen, and can then also act as an input device or keypad, such as for providing a soft-key keyboard, navigation buttons, or any other type of input. The output devices 614 can include any sort of output devices known in the art, such as the display 612, speakers, a vibrating mechanism, and/or a tactile feedback mechanism. Output devices 614 can also include ports for one or more peripheral devices, such as headphones, peripheral speakers, and/or a peripheral display. The input devices 616 can include any sort of input devices known in the art. For example, input devices 616 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 618 can store one or more sets of instructions, such as software or firmware, that embodies any one or more of the methodologies or functions described herein. The instructions can also reside, completely or at least partially, within the memory 602, processor(s) 608, and/or radio interface(s) 610 during execution thereof by the UE 102. The memory 602 and the processor(s) 608 also can constitute machine readable media 618.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

While one or more examples of the techniques described herein have been described, various alterations, additions, permutations and equivalents thereof are included within the scope of the techniques described herein. For instance, techniques described in FIGS. 5 and 6 can be combined in various ways.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method comprising:

receiving, by a server of a fifth generation (5G) telecommunications network, a message indicating a request to terminate a communication session associated with a user equipment (UE), wherein the message is a Npcf_PolicyAuthorization_delete message;

determining, by the server, that the message is associated with a Policy Authorization Service implemented by a Policy Control Function (PCF);

determining, by the server, a value representing a cause for the communication session to terminate;

modifying, by the server and as a modified message, the message to include a field identifying the cause for the communication session to terminate; and transmitting, by the server, the modified message to a network function of the 5G telecommunications network, wherein the server provides an application function (AF) and the network function includes the PCF.

2. The method of claim 1, wherein determining that the message is associated with the Policy Authorization Service comprises identifying that that the message is an Npcf service-based message.

3. The method of claim 1, wherein the modified message is transmitted using an N5 interface.

4. The method of claim 1, wherein:

the AF comprises a proxy call session control function (PCSCF) associated with an Internet Protocol (IP) Multimedia Subsystem (IMS).

5. The method of claim 1, wherein:

the message is a first message, and determining the value representing the cause for the communication session to terminate comprises identifying a text value in a second message associated with the server.

6. The method of claim 5, wherein the second message is a Session Initiation Protocol message or a message sent in association with an Rx interface.

7. The method of claim 1, wherein the value is a Termination-Cause AVP Value.

8. The method of claim 1, wherein the value is associated with a first amount of data and further comprising:

determining, in the field, a second amount of data to represent the cause for the communication session to terminate, the second amount of data less than the first amount of data; and adding the second amount of data to the field of the modified message.

9. The method of claim 1, wherein determining the value representing the cause for the communication session to terminate comprises:

identifying first text associated with the cause for the communication session to terminate from another message associated with the server;

modifying the first text to output second text different from the first text; and outputting the second text as the value representing the cause for the communication session to terminate.

10. The method of claim 1, wherein modifying the message to include the field identifying the cause for the communication session to terminate comprises concatenating the value representing the cause with the message.

11. A system comprising:

one or more processors; and memory storing computer-executable instructions that, when executed by the one or more processors, cause the system to perform operations comprising:

configuring, by a server of a fifth generation (5G) telecommunications network, a Policy Authorization Service message for sending to a Policy Control Function (PCF), the Policy Authorization Service message indicating a request to terminate a communication session, the configuring including:

determining to send the Policy Authorization Service message using an N5 interface;

identifying a value representing a cause for the communication session to terminate;

adding the value to the Policy Authorization Service message; and sending, by the server, the Policy Authorization Service message with the value to the PCF, wherein the server provides an application function (AF) that comprises a proxy call session control function (PCSCF) associated with an Internet Protocol (IP) Multimedia Subsystem (IMS).

12. The system of claim 11, wherein:

identifying the value representing the cause for the communication session to terminate comprises identifying a text value in a message different from the Policy Authorization Service message.

13. The system of claim 11, wherein adding the value comprises:

modifying the Policy Authorization Service message to include a field identifying the cause for the communication session to terminate; and adding the value to the field.

14. The system of claim 11, the operations further comprising:

determining, based at least in part on the value, whether the cause for the communication session to terminate is an expected result or an unexpected result; and determining performance of the 5G telecommunications network based at least in part on a number of unexpected results over time.

15. One or more non-transitory computer-readable media storing instructions executable by one or more processors, wherein the instructions, when executed, cause the one or more processors to perform operations comprising:

receiving, by a server of a telecommunications network, a message indicating a request to terminate a communication session associated with a user equipment (UE), wherein the message is a Npcf_PolicyAuthorization_delete message;

determining, by the server, that the message is associated with a Policy Authorization Service implemented by a Policy Control Function (PCF);

determining, by the server, a value representing a cause for the communication session to terminate;

modifying, by the server and as a modified message, the message to include a field identifying the cause for the communication session to terminate; and transmitting, by the server, the modified message to a network function of the telecommunications network, wherein the server provides an application function (AF) and the network function includes the PCF.

16. The one or more non-transitory computer-readable media of claim 15, wherein determining that the message is associated with the Policy Authorization Service comprises identifying that that the message is an Npcf service-based message.

17. The one or more non-transitory computer-readable media of claim 15, wherein the modified message is transmitted using an N5 interface.

18. The one or more non-transitory computer-readable media of claim 15, wherein the AF comprises a proxy call session control function (PCSCF) associated with an Internet Protocol (IP) Multimedia Subsystem (IMS).

* * * * *